United States Patent [19]
Tsunemi et al.

[11] Patent Number: 6,144,010
[45] Date of Patent: Nov. 7, 2000

[54] METHOD OF REMOVING COATING FILM WITH LASER BEAM AND LASER PROCESSING SYSTEM

[75] Inventors: Akira Tsunemi, Tokyo; Teruhiko Takusagawa, Chiba; Yukiko Funabiki, Tokyo, all of Japan

[73] Assignee: Sumitomo Heavy Industries, Ltd., Tokyo, Japan

[21] Appl. No.: 09/072,938

[22] Filed: May 5, 1998

[30] Foreign Application Priority Data

May 12, 1997 [JP] Japan ................................. 9-121234
Mar. 11, 1998 [JP] Japan ................................ 10-059966

[51] Int. Cl.[7] ................................................. G21F 9/28
[52] U.S. Cl. ........................... 219/121.68; 219/121.81; 219/121.84
[58] Field of Search ........................ 219/121.6, 121.62, 219/121.68, 121.73, 121.74, 121.75, 121.76, 121.78, 121.81, 121.83, 121.84

[56] References Cited

U.S. PATENT DOCUMENTS 5,196,672  3/1993  Matsuyama et al. ............. 219/121.83
5,662,762  9/1997  Ranalli ........................... 219/121.69 X
5,986,234  11/1999  Matthews et al. ................. 219/121.68

FOREIGN PATENT DOCUMENTS

83/01400  4/1983  WIPO.

OTHER PUBLICATIONS

Head et al., "Laser Paint Stripping," NTIS report ADA 249 233, Jan. 1991, pp. iii–v and 83–89.

Lu et al., "Laser Surface Cleaning in Air: Mechanisms and Applications," Japanese Journal of Applied Physics, vol. 33 Part 1, No. 12B, Dec. 1994, pp. 7138–7143.

Primary Examiner—Samuel M. Heinrich
Attorney, Agent, or Firm—Frishauf, Holtz, Goodman, Langer & Chick, P.C.

[57] ABSTRACT

A laser light is applied to the surface of an object to be processed and formed with a coating film and at least an upper portion of the coating film is removed through abrasion, by using an energy density variable optical system capable of applying the laser light to the surface of the object and varying an energy density of the laser light on the surface of the object. The coating film can be removed without using chemicals.

10 Claims, 3 Drawing Sheets

METHOD OF REMOVING COATING FILM WITH LASER BEAM AND LASER PROCESSING SYSTEM

This application is based on Japanese Patent Applications HEI-9-121234 filed on May 12, 1997 and HEI-10-59966 filed on Mar. 11, 1998, the entire contents of which are incorporated herein by reference.

BACKGROUND OF THE INVENTION a) Field of the Invention

The present invention relates to a method of removing a coating film with laser beams and to a laser processing system suitable for use with the coating film removing method.

b) Description of the Related Art

Chemicals called methylene chloride highly toxic have been mainly used for removing a coating on an outer frame of a machine such as an airplane. Conventionally, this chemical is blown on the surface of a coating film to fragilize it and thereafter the coating film is scraped off from the outer frame surface of a machine.

Such a conventional method of removing a coating film has a low work efficiency and there are some problems on the collection and dumping of toxic waste.

SUMMARY OF THE INVENTION

It is an object of the present invention to provide a method of removing a coating film without using chemicals and to a laser processing system suitable for use with the coating film removing method.

According to one aspect of the present invention, there is provided a method of removing a coating film, comprising the step of: applying a laser light to a surface of an object to be processed and formed with a coating film thereon and removing at least an upper portion of the coating film through abrasion, by using an energy density variable optical system capable of applying the laser light to the surface of the object and varying an energy density of the laser light on the surface of the object.

If the energy density of radiated laser light is too low, abrasion does not occur, whereas if it is too high, the underlying material of the coating film is damages. There is therefore a proper range of the energy density when the coating film is removed through abrasion. By using the energy density variable optical system, the energy density can be set in the proper range.

According to another aspect of the present invention, there is provided a laser processing system comprising: a lens for converging or diverging a laser light and applying the laser light to a surface of an object to be processed; a lens support mechanism for supporting the lens and adjusting a height of the lens from the surface of the object in accordance with an external control signal; a height sensor for detecting the height of the lens from the surface of the object; control means for receiving an output signal from the height sensor and controlling the lens support mechanism so as to make constant the height of the lens from the surface of the object; and a first deflector disposed in an optical path of the laser light to be incident upon the lens, for moving a radiation position of the laser light along a first direction on the surface of the object, by changing a transmission direction of the laser light.

By changing the height of the lens from the surface of the object, the energy density of the laser light on the surface of the object can be changed. By moving the laser radiation position, the laser light can be applied to a broad area.

Since abrasion is used, the coating film on the surface of the object can be removed without using chemicals.

DETAILED DESCRIPTION OF THE PREFERRED EMBODIMENTS

Figure 1:
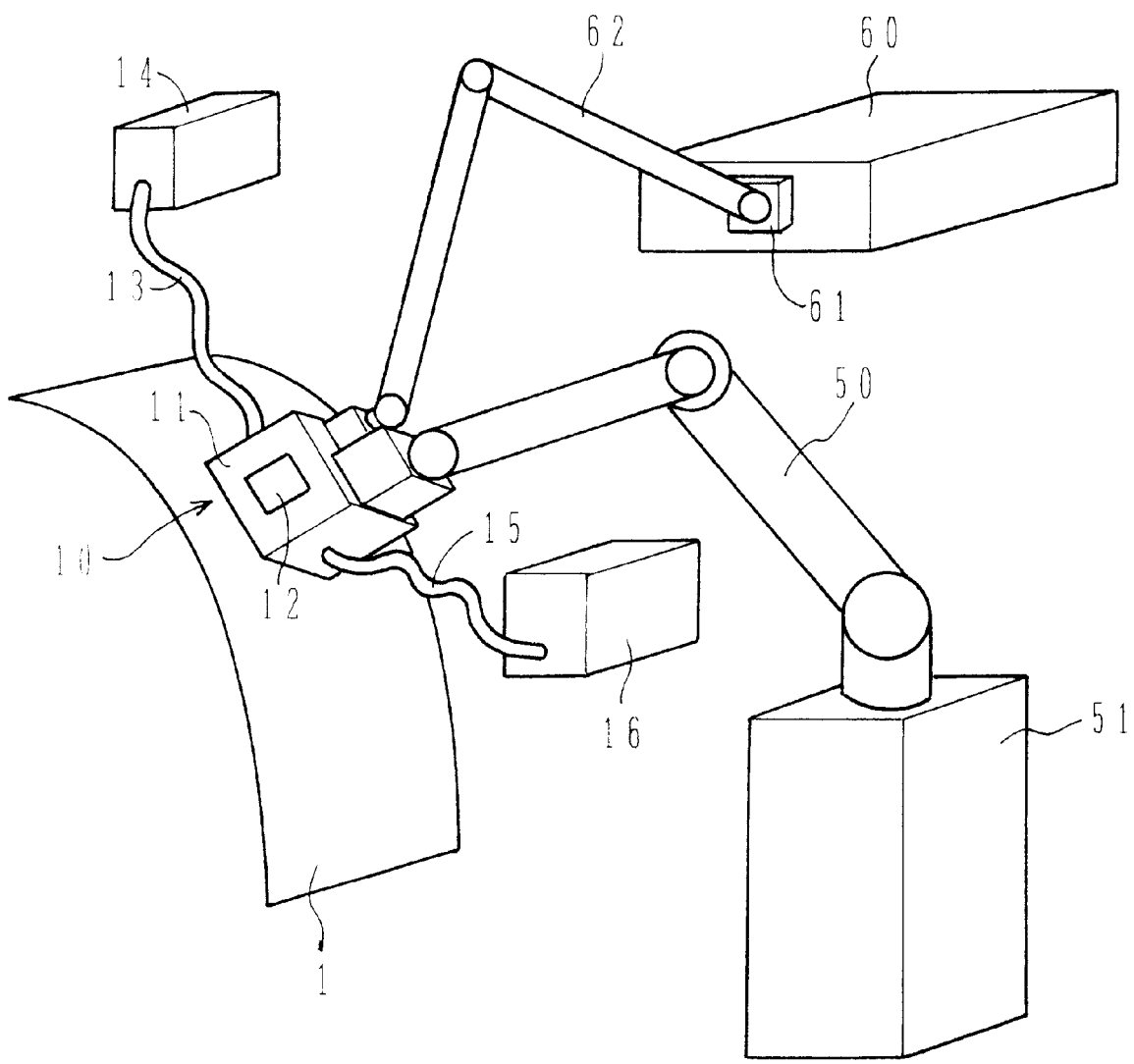
FIG. 1 is a perspective view showing the outline of a laser processing system according to an embodiment of the invention.

FIG. 1 is a schematic perspective view showing the outline of a laser processing apparatus according to an embodiment of the invention. A laser radiation head 10 is in contact with an object 1 to be processed. The laser radiation head 10 is constituted of a box-type container 11 having an opening on the side of the object 1 and optical components housed in the box-type container. A transparent window 12 is formed in the side wall of the box-type container 11 so that the inside of the container 11 can be observed therethrough. The box-type container 11 itself may be made of transparent material.

The laser radiation head 10 is mounted on the distal end of a manipulator 50. The manipulator 50 is controlled by a manipulator control unit 51 which supports and moves the laser radiation head 10 to a desired position of the surface of the object 1. It is preferable that in order to remove a coating film on an airplane or the like, the laser radiation head 10 is made freely movable at least in a square of 1 m×1 m.

A laser beam output from a laser beam generator 60 is introduced into the laser radiation head 10 via a beam shaping optical unit 61 and a beam transmission arm 62.

The laser beam generator 60 may be a transverse direction excitation—atmospheric pressure type $CO_2$ laser system (TEA-$CO_2$ laser system). The TEA-$CO_2$ laser system pulsatively outputs a laser beam having a wavelength of 9 to 11 $\mu$m.

The beam shaping optical unit 61 shapes the cross section of a laser beam output from the laser beam generator 60 to a desired shape. For example, this unit has an aperture with a rectangle through hole which shapes the laser beam cross section to a rectangle.

The beam transmission arm 62 is structured to be expandable, for example, by providing a plurality of articulations. The beam transmission arm 62 moves following a motion of the laser radiation head 10 to thereby introduce the laser beam passed through the beam shaping optical unit 61 to the laser radiation head 10.

The laser radiation head 10 has a gas inlet pipe 13 and a gas exhaust pipe 15 mounted thereon. The gas inlet pipe 13 is connected to a gas supply unit 14 which supplies gas via the gas inlet pipe 13 to the inside of the laser radiation head 10. The gas exhaust pipe 15 is coupled to a gas drain unit 16 which drains the gas in the laser radiation head 10 via the gas exhaust pipe 15.

Figure 2:
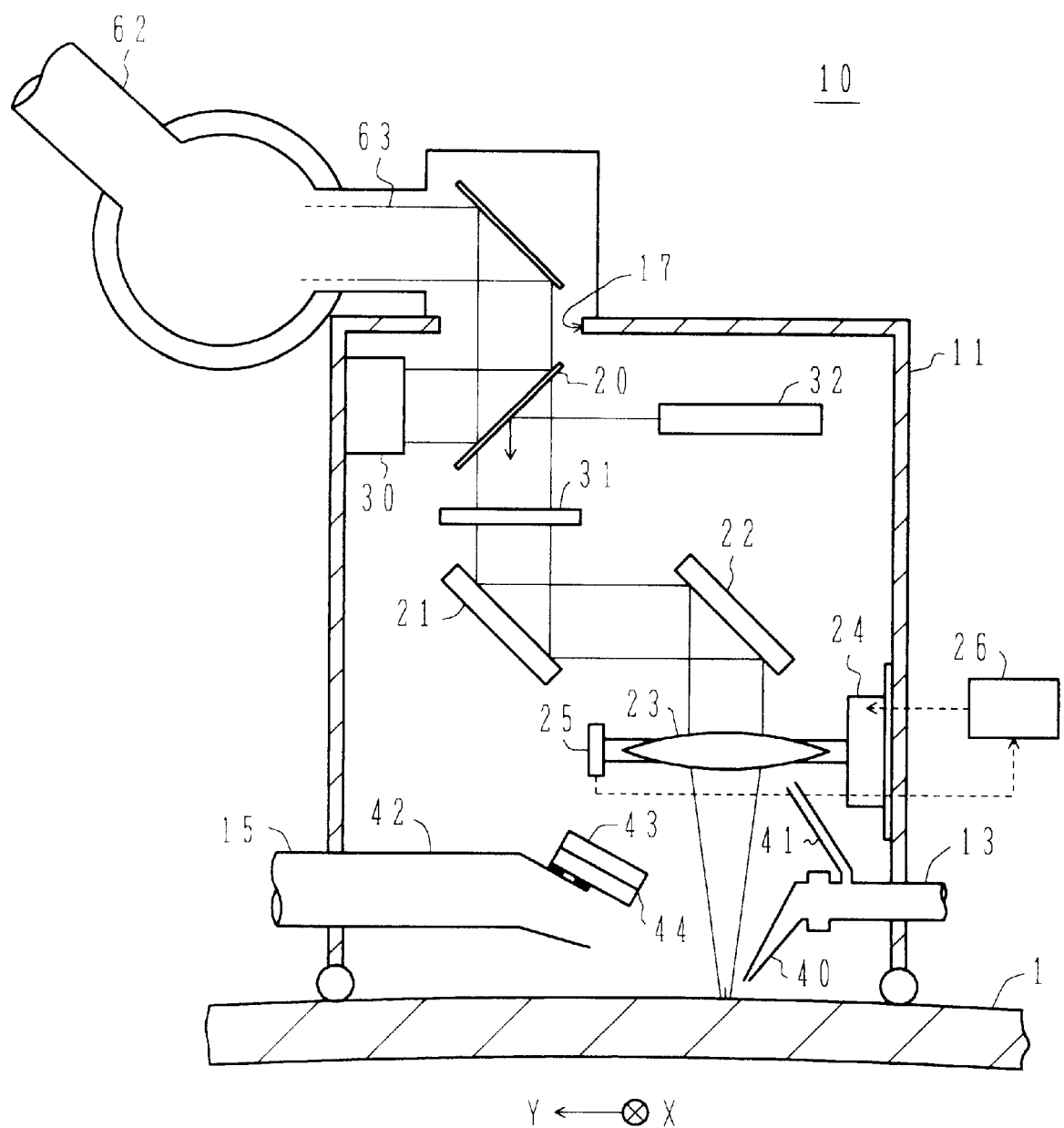
FIG. 2 is a cross sectional view showing the outline of a laser radiation head shown in FIG. 1.

FIG. 2 is a schematic cross sectional view of the laser radiation head 10 shown in FIG. 1. The box-shape container 11 having an opening facing the object 1 is supported such that the nearby area of its opening is in nearly contact with the surface of the object 1. The laser transmission arm 62 is coupled to a through hole 17 formed in the wall opposite to the opening of the box-shape container 11. A laser beam 63 transmitted in the laser transmission arm 62 is introduced via the through hole 17 into the box-shape container 11.

The laser beam introduced into the box-shape container 11 transmits through a half mirror 20 and a homogenizer 31, is reflected by deflectors 21 and 22, and becomes incident upon a converging lens 23. The deflectors 21 and 22 deflect the laser beam to move the laser beam radiation position along orthogonal X- and Y-axes on the surface of the object 1 and may be galvano mirrors. The laser beam converged by the converging lens 23 is applied to the surface of the object 1.

The half mirror 20 partially reflects the laser beam to make it incident upon an energy sensor 30 which measures the energy of the laser beam.

The homogenizer 31 makes the intensity distribution of a laser beam in its cross sectional plane nearly uniform.

If the deflectors 21 and 22 are made of galvano mirrors, it is preferable to use an arc sine lens as the converging lens 23 in order to maintain constant the motion speed of the laser radiation point. From the same reason, an fθ lens is preferably used as the converging lens 23 if a deflection angle of the laser beam given by the deflectors 21 and 22 changes proportionally with time. The deflectors 21 and 22 may be rotary polygon mirrors. Even if the fθ lens is used, it is possible to maintain constant the motion speed of the laser radiation position by controlling the angle change of the galvano mirrors to non-linearly change with time.

The converging lens 23 is mounted on the side wall of the box-shape container 11 by a converging lens support mechanism 24. This converging lens support mechanism 24 can adjust the height of the converging lens 23 from the surface of the object 1. A height sensor 25 is mounted on the converging lens 23. The height sensor 25 detects the height of the converging lens 23 from the surface of the object 1 and sends a detection signal to a height controller 26.

The height controller 26 stores in advance a height target value. In accordance with the detection signal sent from the height sensor 25, the height controller 26 adjusts the height of the converging lens 23 by controlling the converging lens support mechanism 24 to make the height of the converging lens 23 take a value near the height target value.

A visual light laser system 32 is installed in the box-shape container 11. The visual light laser system 32 may be an He—Ne laser system. A visual light laser beam output from the visual light laser system 32 is reflected by the half mirror 20 and transmits along the same optical axis as the laser beam entered from the through hole 17. Therefore, the visual light laser beam is applied to generally the same surface area of the object as the TEA-$CO_2$ laser beam. It is therefore possible to observe the laser beam radiation position through the transparent window 12 shown in FIG. 1.

Nozzles 40 and 41 are disposed in the box-shape container 11. These nozzles 40 and 41 communicate with the gas inlet pipe 13 mounted on the side wall of the box-shape container 11. The nozzle 40 jets out gas to the laser beam radiation position and its nearby area on the surface of the object 1. The nozzle 41 jets out gas toward the converging lens 23 to its front surface on the side of the object 1. This gas flow suppresses foreign materials flying from the surface of the object 1 from being attached to the surface of the converging lens 23.

A gas suction port 42 disposed in the box-shape container 11 communicates with the gas exhaust pipe mounted on the side wall of the box-shape container 11. The tip of the gas suction port faces the laser radiation position on the surface of the object 1. The gas suction port 42 can drain gas in the box-shape container 11 and can drain removed substances flying from the laser radiation area.

A color sensor 43 and a temperature sensor 44 are mounted near the tip of the gas suction port 42. The color sensor 43 includes a CCD for detecting colors of the laser beam radiation position and its nearby area of the object 1. The temperature sensor 44 may be a radiation thermometer for detecting a temperature of the laser beam radiation position and its nearby area of the object 1. For example, when a coating film on the outer frame surface of an airplane is to be removed, it is necessary to apply a laser beam while the temperature of the outer frame surface of the airplane is maintained at 80° C. or lower. By always monitoring the surface temperature with the temperature sensor 44, it becomes possible to stop laser radiation before the temperature of the outer frame surface of an airplane rises to 80° C. or higher, or to take other necessary measures. For example, a temperature of 80° C. or lower is previously set as a safety temperature, and if the measured temperature exceeds this safety temperature, laser radiation is stopped.

Next, the operation of the laser processing system shown in FIGS. 1 and 2 will be described by taking as an example the operation of removing a coating film on the surface of an object.

A laser beam entered the laser radiation head 10 shown in FIG. 2 is applied to the surface of the object 1 to remove a coating film through abrasion. If the energy density (fluence rate) of the laser beam applied to the surface of the object 1 is too low, the coating film cannot be abraded, whereas if it is too high, the underlying material of the coating film may be damaged. It is therefore preferable to set the energy density of the laser beam in a range not damaging the underlying material and allowing the coating film to be abraded. If the energy density of the laser beam output from the laser beam generator is sufficiently high, a diverging lens may possibly be used in place of the converging lens 23.

The energy density can be adjusted by changing the radiation area by changing the height of the converging lens 23 from the surface of the object 1 with the converging lens support mechanism 24. The proper range of the energy density changes depending upon the kinds of an underlying material and a coating film. It is therefore preferable to perform preliminary experiments at different energy densities to determine a proper energy density range, i.e., a proper height of the converging lens 23.

The height controller 26 stores in advance a proper height of the converging lens 23. The height controller 26 compares the pre-stored proper height with a height detected with the height sensor 25, and controls the converging lens support mechanism 24 so that the height of the converging lens 23 takes a value near the proper height. With this height control, abrasion is realized always at a proper energy density.

The deflector 22 scans the laser beam radiation position along the X-axis direction, and thereafter the deflector 21 shifts it along the Y-axis direction. Next, the deflector 22 again scans the laser beam along the X-axis direction by the same amount as the preceding scan. These scans are repeated so that the coating film in a desired surface area of the object 1 can be removed through abrasion.

The manipulator arm 50 shown in FIG. 1 is driven to change the position of the laser radiation head 10, and thereafter scanning along the X- and Y-axes described above is repeated. In this manner, the coating film in a broader surface area of the object 1 can be removed through abrasion.

The height of the converging lens 23 from the surface of the object 1 may vary as the laser radiation head 10 is moved, because of a change in the surface curvature of the object 1 or an irregular surface of the object 1. In such a case, the height of the converging lens 23 can be maintained constant with the help of the height sensor 25 and height controller 26. It is therefore possible to maintain constant the energy density of a laser beam on the surface of the object 1, allowing stable abrasion.

The scanning directions by the deflectors 21 and 22 are not necessarily orthogonal, but other directions are possible if they are mutually intersected.

In the scanning method described above, two-dimensional scanning by the deflectors 21 and 22 is used. One-dimensional scanning may be performed by using one of the deflectors 21 and 22. In this case, the laser radiation head 10 is moved along a direction intersecting the scanning direction, by using the manipulator arm 50 shown in FIG. 1. In the manners described above, a laser beam can be applied to a broader surface area of the object 1.

A temperature rise on the surface of the object 1 can be suppressed by blowing gas from the nozzle 40 toward the surface of the object 1. As the gas to be blown, gas not oxidizing the object 1 is preferable, including inert gas such as Ar gas and He gas, and $N_2$ gas. If the material with high resistance to oxidation is to be processed, air may be blown. Removed substances flying from the surface of the object 1 are drained from the gas suction port 42.

Use of abrasion allows the coating film to be removed without using toxic chemicals.

Next, experiment results of removing coating films will be described with reference to FIG. 3. Samples used for the experiments were aluminum plates with a coating film of about 80 $\mu$m in thickness usually used for painting the outer frame surface of an airplane. The laser light generator 60 used was a TEA-$CO_2$ laser system which output a pulse laser beam at a repetition frequency of 100 Hz. The energy density of a laser beam on the surface of the object 1 was about 5 J/cm$^2$ and the shape of the radiation area was a rectangle of about 14 mm×1 mm longer in the Y-axis direction. An area removed through abrasion was a rectangle of about 5 mm×0.5 mm. A motion distance between shots along the X-axis direction was about 0.5 mm and the scan speed of the laser beam radiation position along the X-axis direction was 25 mm/s.

Figure 3:
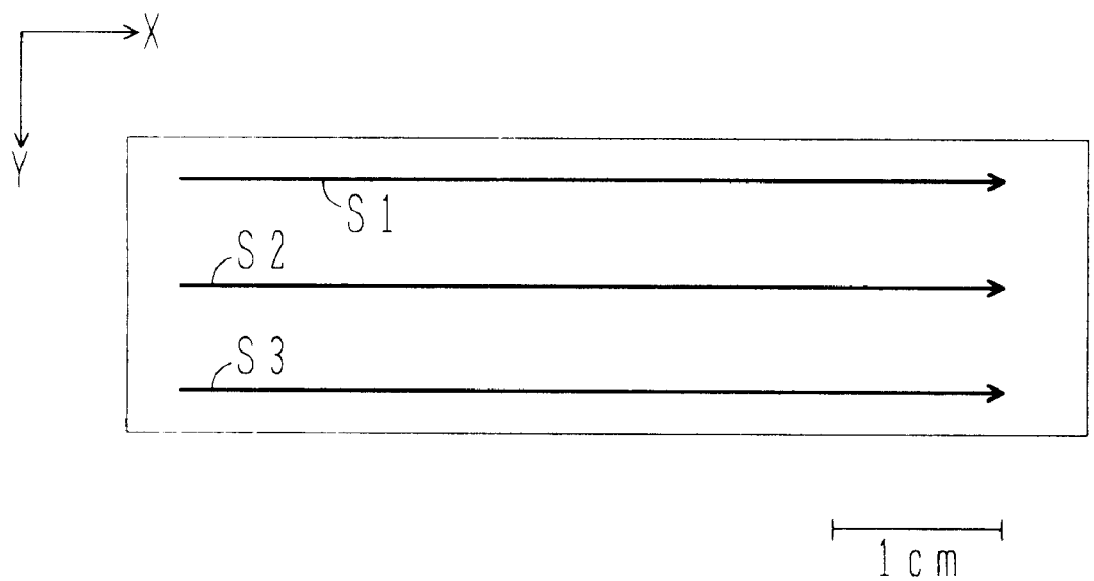
FIG. 3 is a diagram illustrating laser beam scanning.

FIG. 3 illustrates a laser beam radiation history. First, the laser beam was scanned by about 5 cm in the X-axis direction by the deflector 22, as shown by an arrow S1. Next, the laser beam was shifted by about 0.5 cm in the Y-axis direction by the deflector 21, and scanned in the X-axis direction by the same amount as the first scan, as shown by an arrow S2. The laser beam was further shifted by about 0.5 cm in the Y-axis direction and scanned in the X-axis direction by the same amount as shown by an arrow S3. With the scans shown by the arrows S1 to S3, the laser beam was able to be irradiated to a rectangular area of about 5 cm×1.5 cm. The scans shown by the arrows S1 to S3 were repeated three times.

According to the experiment results, the coating film on the surface of the aluminum plate was generally perfectly removed and the surface of the aluminum base material plate was exposed. No damage was observed on the surface of the aluminum plate.

In the above experiments, the same surface area of the object was applied with the laser beam three times. By reducing the number of laser beam radiations, only the upper layer portion of the coating film can be removed by leaving the lower layer portion. A coating film on the outer frame surface of an airplane is generally constituted of a primary layer and a top coat layer formed thereon, the primary layer functioning as a bonding and rust-proof layer and the top coat layer functioning as a decorative layer. For example, by adjusting the number of laser radiations, only the top coat layer can be removed.

In the above embodiment, although a pulse oscillation type TEA-$CO_2$ laser system is used as the laser light generator, other laser systems may also be used, such as an Nd:YAG laser system, an Nd:YLF laser system and an excimer laser system. The type of oscillation is not limited only to the pulse oscillation type, but a continuous oscillation type may also be used. Higher harmonics, e.g., second to fifth harmonics, or Raman scattered light, of a laser beam output from these laser systems may also be used. A copper vapor laser system, a CO laser system, a semiconductor laser system and the like may be used.

The present invention has been described in connection with the preferred embodiments. The invention is not limited only to the above embodiments. It is apparent that various modifications, improvements, combinations, and the like can be made by those skilled in the art.

What is claimed is:

1. A laser processing system comprising:
   a lens for converging or diverging a laser light and applying the laser light to a surface of an object to be processed;
   a lens support mechanism for supporting said lens and adjusting a height of said lens from the surface of the object in accordance with an external control signal, said lens having a front surface which faces the object;
   a height sensor for detecting the height of said lens from the surface of the object;
   control means for receiving an output signal from said height sensor and controlling said lens support mechanism so as to make constant the height of said lens from the surface of the object;
   a fist deflector disposed in an optical path of the laser light to be incident upon said lens, for moving a radiation position of the laser light along a first direction on the surface of the object, by changing a transmission direction of the laser light; and
   a nozzle arranged to let out gas in a direction toward the front surface of said lens which faces the object.

2. A laser processing system according to claim 1, further comprising a second deflector disposed in an optical path of the laser light to be incident upon said lens, for moving a radiation position of the laser light along a second direction intersecting the first direction on the surface of the object, by changing a transmission direction of the laser light.

3. A laser processing system according to claim 1, further comprising an aperture disposed in an optical path of the laser light to be incident upon said lens, for limiting a shape of the laser light in a cross section vertical to an optical axis of the laser light to a certain shape.

4. A laser processing system according to claim 1, further comprising a homogenizer disposed in an optical path of the laser light to be incident upon said lens, for making generally uniform an intensity distribution of the laser light in a cross section vertical to an optical axis of the laser light.

5. A laser processing system according to claim 1, further comprising a temperature sensor for detecting a temperature of the surface of the object applied with the laser light.

6. A laser processing system according to claim 1, further comprising a visual laser light source for applying a visual laser light to said lens along a same optical axis as the laser light.

7. A laser processing system according to claim 1, further comprising gas blowing means for blowing gas toward the surface of the object applied with the laser light.

8. A laser processing system according to claim 1, further comprising:
- a laser head container which houses said lens, said lens support mechanism, said height sensor, and said first deflector; said nozzle and
- laser head support means for supporting and moving said laser head container along the surface of the object.

9. A laser processing system according to claim 1, further comprising a further nozzle arranged to jet out gas onto the surface of the object on which the laser light is incident.

10. The laser processing system according to claim 8, further comprising a further nozzle in said laser head container, said further nozzle being arranged to jet out gas onto the surface of the object on which the laser light is incident.

* * * * *